United States Patent [19]

Pelesko et al.

[11] Patent Number: 5,239,017

[45] Date of Patent: Aug. 24, 1993

[54] CONTINUOUS PROCESS FOR THE PRODUCTION OF PRESSURE SENSITIVE ADHESIVE MASS COMPOSITIONS AND ARTICLES MADE THEREFROM

[75] Inventors: John D. Pelesko, Roselle, N.J.; Gary S. Russell, Hampshire, United Kingdom

[73] Assignee: ISP Investments Inc., Wilmington, Del.

[21] Appl. No.: 691,957

[22] Filed: Apr. 26, 1991

[51] Int. Cl.$^5$ ................................................ C08F 8/12
[52] U.S. Cl. ................................ 525/383; 156/272.2; 156/275.5; 525/327.7; 525/327.8; 525/384
[58] Field of Search ............................... 525/383, 384; 156/272.2, 275.5

[56] References Cited

U.S. PATENT DOCUMENTS

| | | | |
|---|---|---|---|
| 2,866,775 | 12/1958 | Sellers | 525/327.7 |
| 3,983,095 | 9/1976 | Bashaw et al. | 525/327.7 |
| 4,253,898 | 3/1981 | Rinker et al. | 525/305 |
| 4,680,319 | 7/1987 | Gimpel et al. | 525/363 |
| 4,808,637 | 2/1989 | Boardman et al. | 525/360 |
| 5,106,914 | 4/1992 | Russell et al. | 525/383 |

*Primary Examiner*—Bernard Lipman
*Attorney, Agent, or Firm*—Walter Katz; Marilyn J. Maue; Joshua J. Ward

[57] ABSTRACT

A continuous process for the production of pressure sensitive adhesive mass compositions and adhesive elements which exhibit excellent properties with respect to a variety of substrates, which is non-toxic and non-sensitizing. The element exhibits high cohesive strength so that its integrity is maintained on removal from the substrate leaving no residues and is highly flexible so that total confirmation with the underlying shape of the substrate is maintained. The adhesive composition includes the hydrolysis/esterification product of a methyl vinyl ether/maleic anhydride copolymer with an hydroxylated compound. In this invention, the adhesive element is prepared by microwave heating of a mixture of the copolymer and hydroxylated compound, preferably with a surfactant, in the presence of water.

14 Claims, No Drawings

CONTINUOUS PROCESS FOR THE PRODUCTION OF PRESSURE SENSITIVE ADHESIVE MASS COMPOSITIONS AND ARTICLES MADE THEREFROM

BACKGROUND OF THE INVENTION

1. Field of the Invention

This invention relates to pressure sensitive adhesive mass compositions, which are easily formable to shaped articles suitable for use in surgical, medical, and industrial applications, and particularly to a continuous process for the production of such compositions and articles.

2. Description of the Prior Art

Various adhesive mass compositions suitable for medical use, and in particular, adapted to be used for ostomy appliances, are disclosed in the patent literature. (See U.S. Pat. No. 4,393,080). Generally, such compositions require resistance to erosion by moisture or other biological fluids, must exhibit good adherence to the human skin, and also not be irritating. In addition, it is desired that the adhesive compositions be easily shaped so as to conform to the contours of the surface to which they are being applied and yet be simple to prepare.

Attempts to formulate such compositions utilizing mixtures of various polymers and hydroxyl-containing compounds, such as, Gantrez ® AN polymers (a product of GAF Chemicals Corporation) which is composed of a copolymer of methyl vinyl ether and maleic anhydride, glycerol, polyethylene oxide, or ethoxylated alkyl phenol or nonyl phenols are known. However, improvements in such adhesive elements are in constant demand, particularly, with respect to exhibiting the concomitant properties of good adhesion to the surface, ability to conform to the surface, and an absence of irritation to the skin, for medical applications.

SUMMARY OF THE INVENTION

What is described herein is a continuous process for the production of an adhesive element which exhibits highly desirable properties with respect to the above-outlined requirements. During the process, the adhesive element is formed by an hydrolyzing or esterifying reaction between a copolymer of methyl vinyl ether and maleic anhydride having the formula:

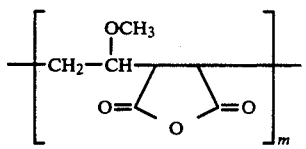

wherein n is such that the weight average molecular weight is from about $2 \times 10^5$ to $2.4 \times 10^6$, and a hydrolyzing or esterifying agent to form a smooth adhesive mass. The resultant adhesive mass preferably is formed into a particular shape before the reaction. The reaction may be carried out in a continuous manner for a period of time by subjecting the copolymer and the hydrolyzing or esterifying compound to microwave heating which is sufficient to form an adhesive gel. Upon cooling, a formed adhesive mass of element is obtained which may be in the particular desired shape suitable for use in medicinal and other end uses.

In a preferred embodiment of the invention, the adhesive composition is present as part of a shaped article, such as films, and in which a plurality of such articles are continuously processed through a microwave energy unit, under conditions which prevent excessive drying of the composition during passage through the microwave element.

DETAILED DESCRIPTION OF THE INVENTION

More particularly, in the continuous process of the invention, a variety of adhesive mass elements which are useful in many different medical devices, and can be easily formed into desired shapes, including films, are obtained by reacting slurries of a first component comprising the methyl vinyl ether/maleic anhydride copolymer with a second component comprising an hydroxylated compound to hydrolyze/esterify the copolymer.

Typically, the hydrolysis product is a diacid, whereas the esterification product is a partial or full ester. Preferably the ester is obtained, alone or in combination with the diacid, according to the following reaction sequences:

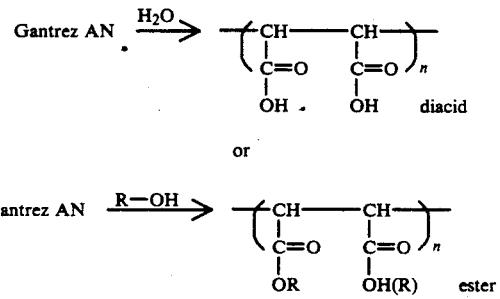

Depending upon the particular hydrolyzing/esterification compounds used, the adhesive masses may have varying degrees of tack, shear and peel strength.

Moreover, in a preferred embodiment, the masses can be formed within a container, or encapsulated, which allows shaping of the element and which also can provide packaging for the adhesive mass composition until its intended use. In a particularly preferred embodiment, the masses are present on a support, such as a film, and covered by a strippable film, thus forming an adhesive article for use as a bioadhesive element upon microwave processing.

Preferably, the methyl vinyl ether/maleic anhydride copolymer first component includes polymers wherein n provides a weight average molecular weight of about $1.25 \times 10^6$ to $2.4 \times 10^6$, and most preferably, about $1.08 \times 10^6$ to $1.98 \times 10^6$. A wide variety of such copolymers are marketed under the trademark Gantrez (GAF Chemicals Corporation).

The preferred materials for the first component are long chain methyl vinyl ether/maleic anhydride copolymers wherein the maleic anhydride moiety in the polymer is intact, e.g. Gantrez AN-119, Gantrez AN-139 and Gantrez AN-169.

The second component used to form the adhesive composition is an hydroxylated compound which serves to hydrolyze or esterify the polymer. Suitable hydroxylated compounds include glycerol, polyethoxylated fatty alcohols, oleyl alcohols, nonyl phenols and octyl phenols. Other hydroxylated compounds include polyethoxylated fatty alcohols, polyethylene glycol, 1,3-butanediol, 1,4-butanediol, propylene glycol, 1,3-propane diol and ethylene glycol. Polyols are preferred.

The amount of the first component reactant used for the reaction hydrolysis-esterification reaction suitably is about 5 to 50 weight %; preferably about 10 to 40 weight %, and most preferably, about 25 weight %, based on the total weight of the composition.

The amount of second component hydroxylated compound used for the reaction in the present invention is about 5 to 50 weight %, preferably, about 10 to 40 weight %, and most preferably, about 25 weight %, based on the total weight of the composition.

A surfactant is another useful constituent of the adhesive mass composition of the invention. Suitably it is present in amounts similar to the reaction components.

The remainder of the composition is water, usually in an amount of about 5–50% by weight of the mixture, preferably about 10–40%, and most preferably about 25%.

In addition, the composition may employ various additives, e.g. humectants, fillers, and the like. Humectants are particularly useful since they serve to prevent the finished adhesive mass element from drying out during storage and use. Suitable humectants include non-ionic surfactants, as well as certain compounds within the class of hydroxylated compounds which are suitable as second component materials, e.g. glycerol and polyethylene glycol. For such compounds, the second component and/or the surfactant may function as both a reactant and humectant. The amount of humectant in the composition, if present, generally is about 5 to 50 weight %, preferably from about 15 to 35 weight %, and most preferably, about 20 weight %, based on the total weight of the composition.

The adhesive mass composition is prepared in the following manner according to the invention. Generally, a slurry of the methyl vinyl ether/maleic anhydride copolymer first component, the hydroxylated compound second component, the surfactant and/or humectant, and water, are formed by blending the ingredients with stirring at ambient temperature to form a slurry. Normally, this admixing is carried out slowly, i.e., over a period of from about 15 to 20 minutes to ensure uniformity of the mixture and to form a slurry. Preferably either static mixing is used, or mixing is performed under vacuum, to deaerate the slurry.

The reaction slurry mixture then is heated using microwave energy, at an energy level and for a time period sufficient to effect completion of the esterification reaction which it is generally evidenced by the formation of a clear, cohesive, adhesive element which is air-free and flexible.

The microwave processing herein requires only a few minutes, rather than, hours at elevated temperatures, as is necessary in a heating oven. Accordingly, the process of the invention may be carried out herein in a continuous manner using a plurality of slurry elements.

Advantageously, the slurry paste can be placed in a mold, a bag, an encapsulated article, or a, film element, having the desired shape of the final product, and the reaction carried out on such shaped article, thus producing a finished adhesive element having the desired shape. Suitably, the inventive adhesive mass is formed by introducing the mixed reactants (paste) into a flexible bag or container of a plastic film, e.g., polyethylene. The advantage is that the reaction may be formulated within the bag or enclosure, and then shaped while in the bag. The reactants in the shaped bag may be subjected to the reaction conditions and, upon cooling, the element is ready for use upon removal from the bag at the time of use. Consequently, in essentially a series of simple steps, the adhesive can be formulated in a manner which allows it to be stored in its own packaging and one need only remove the mass from the packaging at the time of use.

Preferably, however, the paste is spread on a base or support which may be a flexible or firm material, and covered by a strippable film, thus forming a adhesive element, which, when subjected to microwave processing, immediately provides the desired, finished adhesive element, such as a bioadhesive product.

The following are the chemical names of the trademark products used in the Examples:

Gantrez AN-119:a copolymer of methyl vinyl ether and maleic anhydride with a molecular weight of 200,000;

Gantrez AN-139:a copolymer of methyl vinyl ether and maleic anhydride with a molecular weight of 1,000,000;

Gantrez AN-169:a copolymer of methyl vinyl ether and maleic anhydride with a molecular weight of 2,000,000;

Antarox DM-970:dialkylnonyl phenol ethoxylate;

Pegol F-68:propylene oxide/ethylene oxide copolymer with a ratio of 80/20;

Pegol L-61:propylene oxide/ethylene oxide copolymer with a ratio of 90/10;

Emulphor ON-870:propoxylated (20) oleyl alcohol;

Gafac LO-529:phosphate ester of ethoxylated nonylphenyl;

Pegol 400:polyethylene glycol with a molecular weight of 400;

Pegol 1450:polyethylene glycol with a molecular weight of 1450;

Pegol 4000:polyethylene glycol with a molecular weight of 4000;

Dextrin 30 AN 45:degraded starch;

Igepal CO-610:ethoxylated nonylphenol with a molecular weight of 528–572;

Igepal CO-630:ethoxylated nonylphenol with a molecular weight of 616;

Igepal CO-720:ethoxylated nonylphenol with a molecular weight of 748;

Igepal CO-880:ethoxylated nonylphenol with a molecular weight of 1540;

Igepal CO-990:ethoxylated nonylphenol with a molecular weight of 4620; and

Igepal CA-630:ethoxylated nonylphenol with a molecular weight of 621.

The following examples illustrate the invention:

EXAMPLE 1

A variety of samples listed in Table 1 below were obtained by using different amounts of water, glycerol, surfactant, and methyl vinyl ether/maleic anhydride copolymer. The indicated amounts of water, glycerol, and surfactant were introduced to a glass beaker with stirring under vacuum. The methyl vinyl ether/ maleic anhydride copolymer was added to this mixture and stirring was continued until a slurry was obtained. The deaerated slurry was coated at 20–50 mils WFT (wet film thickness) onto glass and Mylar substrates, covered with a strippable film, and its edges sealed with Scotch tape.

A plurality of the resultant elements were passed continuously under a microwave heating unit* for about 3 minutes residence time at a high energy setting until a clear adhesive mass was formed. The resultant mass was sampled by removing the strippable film from the tab and edges of the element and then removing a portion of the adhesive mass for a test piece.

* microwave oven - Sharp-Carousel II Model R-9360; Output=700 watts; High Setting=100% power; Medium Setting=50% power; Low setting=10% power.

Adhesion to various surfaces was tested by applying a 1 sq. inch mass formed by the above-outlined procedure to skin, glass, paper, gauze dressing, applying slight finger pressure to attach and then attempting to remove the mass as indicated.

Table I shows the compositions of three different formulations produced by the above-outlined method.

TABLE I

|  | Sample No. | | |
| --- | --- | --- | --- |
|  | 1 | 2 | 3 |
| First component |  |  |  |
| Gantrez AN-119 | 25 |  |  |
| Gantrez AN-139 |  | 25 |  |
| Gantrez AN-169 |  |  | 25 |
| Second component |  |  |  |
| Glycerol | 25 | 25 | 25 |
| Surfactant |  |  |  |
| Igepal CO-630 | 25 | 25 | 25 |
| Water | 25 | 25 | 25 |

The adhesion properties of the 3 samples were tested and found to be excellent. The pressure sensitive elements exhibited high cohesive strength so that its integrity is maintained on removal from the substrate leaving no residues and is highly flexible so that the total confirmation with the underlying shape of the substrate is maintained. The adhesive materials also are non-toxic and non-irritating to the skin.

While the invention has been described with particular reference to certain embodiments thereof, it will be understood that changes and modifications may be made which are within the skill of the art. Accordingly, it is intended to be bound only by the following claims, in which:

What is claimed is:

1. A process for the production of an adhesive mass composition which comprises microwave heating of a first component which is a copolymer having the formula:

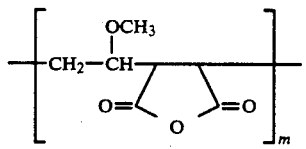

wherein n has a value such that the average molecular weight of the copolymer is about $2 \times 10^5$ to $2.4 \times 10^6$, with a second component which is a hydroxylated compound capable of hydrolyzing or esterifying the first component selected from the group consisting of glycerol, polyethoxylated fatty alcohols, oleyl alcohols, nonyl phenols, octyl phenols, polyethylene glycol, 1,3-butanediol, 1,4-butanediol, propylene glycol, 1,3-propanediol and ethylene glycol, in the presence of water.

2. A process according to claim 1 wherein the reaction mixture further includes a surfactant.

3. A process according to claim 1 wherein the average molecular weight of the copolymer is about $1.25 \times 10^6$ to $2.4 \times 10^6$.

4. A process according to claim 1 wherein the average molecular weight of the copolymer is about $1.08 \times 10^6$ to $1.98 \times 10^6$.

5. A process according to claim 1 wherein the second component is selected from glycerol, polyethoxylated fatty alcohols, nonyl phenols, octyl phenols, polyethylene glycol, 1,3-butanediol, 1,4-butanediol, propylene glycol, 1,3-propane diol and ethylene glycol.

6. A process according to claim 1 where the first component is present in the reaction composition in an amount of about 5 to 50 weight %, and the second component is present in an amount of about 5 to 50 weight %.

7. A process according to claim 6 where the first component is present in the reaction composition in an amount of about 10 to 40 weight %, and the second component is present in an amount of about 10 to 40 weight %.

8. A continuous process for forming a shaped article comprising mixing the first and second components of claim 1 in the presence of water to form a slurry paste, coating the resultant slurry paste onto a base, covering the slurry paste, and reacting the slurry paste mixture by microwave heating for a time sufficient to hydrolyze or esterify the first component, thereby to form a shaped article with a clear, adhesive mass therein.

9. A continuous process according to claim 8 wherein a plurality of such shaped articles are passed continuously through a microwave heating unit to form said desired shaped articles.

10. A process according to claim 8 wherein the slurry paste is deaerated before coating onto a base, thereby forming an air-free adhesive mass composition after microwave heating.

11. A process according to claim 8 where said shaped article is a film article.

12. A process according to claim 8 wherein said first component comprises about 15–35% by weight of a maleic anhydride-methyl vinyl ether copolymer, the second component comprises about 15–30% by weight of glycerol, and about 15–35% by weight of a surfactant and about 15–35% by weight of water also are present.

13. A process according to claim 10 wherein deaeration is accomplished by vacuum mixing or static mixing.

14. A process according to claim 1 wherein said reaction composition includes a humectant.

* * * * *